US012206194B2

(12) United States Patent
Tang

(10) Patent No.: US 12,206,194 B2
(45) Date of Patent: Jan. 21, 2025

(54) ELECTRICAL CONNECTOR ASSEMBLY

(71) Applicant: Bellwether Electronic (Kunshan) Co., Ltd, Kunshan (CN)

(72) Inventor: Xiang-Biao Tang, Kunshan (CN)

(73) Assignee: Bellwether Electronic (Kunshan) Co., Ltd, Kunshan (CN)

( * ) Notice: Subject to any disclaimer, the term of this patent is extended or adjusted under 35 U.S.C. 154(b) by 502 days.

(21) Appl. No.: 17/744,736

(22) Filed: May 16, 2022

(65) Prior Publication Data

US 2022/0399669 A1 Dec. 15, 2022

(30) Foreign Application Priority Data

Jun. 15, 2021 (CN) ......................... 202121327469.8

(51) Int. Cl.

*H01R 13/115* (2006.01)
*H01R 13/02* (2006.01)
*H01R 13/514* (2006.01)
*H01R 43/02* (2006.01)

(52) U.S. Cl.

CPC ......... *H01R 13/115* (2013.01); *H01R 13/025* (2013.01); *H01R 13/514* (2013.01); *H01R 43/02* (2013.01)

(58) Field of Classification Search

CPC .. H01R 13/115; H01R 24/20; H01R 2103/00; H01R 13/112; H01R 13/025; H01R 13/514; H01R 43/02; H01R 4/023
USPC ............................................... 439/752.5, 133
See application file for complete search history.

(56) References Cited

U.S. PATENT DOCUMENTS

| | | | | |
|---|---|---|---|---|
| 9,054,456 | B2 * | 6/2015 | Orris | H01R 13/64 |
| 9,537,253 | B2 * | 1/2017 | Zhao | H01R 13/5837 |
| 9,680,236 | B2 * | 6/2017 | Ngo | H01R 4/48 |
| 10,050,395 | B2 * | 8/2018 | Ngo | H01R 13/6275 |
| 10,374,334 | B2 * | 8/2019 | Li | H01R 9/16 |
| 10,581,196 | B2 * | 3/2020 | Liu | H01R 25/162 |
| 2013/0012072 | A1 * | 1/2013 | Costello | H01R 13/18 439/786 |
| 2020/0161783 | A1 * | 5/2020 | He | H01R 12/7076 |

* cited by examiner

*Primary Examiner* — Tulsidas C Patel
*Assistant Examiner* — Jeffrey Mountain
(74) *Attorney, Agent, or Firm* — Li & Cai Intellectual Property Office

(57) ABSTRACT

An electrical connector assembly is provided. The electrical connector assembly includes a housing, two electrically conductive connection members, and two electrically conductive cable sets. The two electrically conductive connection members are arranged in the housing and respectively connected to the two electrically conductive cable sets. The electrically conductive connection member has an electrically conductive terminal, a cable connection member, and a terminal holding member. The cable connection member is bent relative to a vertical axis and has a first connection part and a second connection part. An electrically conductive cable of the electrically conductive cable set is connected to the first connection part by soldering. The second connection part is coupled to a U-shaped connection part of the electrically conductive terminal. The terminal holding member is arranged at a periphery of the electrically conductive terminal A guide opening is formed on a side of the terminal holding member.

20 Claims, 13 Drawing Sheets

ELECTRICAL CONNECTOR ASSEMBLY

CROSS-REFERENCE TO RELATED PATENT APPLICATION

This application claims the benefit of priority to China Patent Application No. 202121327469.8, filed on Jun. 15, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electrical connector assembly, and more particularly to an electrical connector assembly having an enhanced structural strength.

BACKGROUND OF THE DISCLOSURE

Electrical connector assemblies have a complex internal structure design and a large number of components, such that disassembly and assembly of the electrical connector assemblies are not easily performed. In addition, repeated plugging and unplugging of the electrical connector assemblies easily causes internal components to loosen or shift, which results in poor contact.

Therefore, how to improve the structural design to overcome the above issues has become one of the important issues to be solved in the related field.

SUMMARY OF THE DISCLOSURE

In response to the above-referenced technical inadequacies, the present disclosure provides an electrical connector assembly.

In one aspect, the present disclosure provides an electrical connector assembly including a housing, two electrically conductive connection members, and two electrically conductive cable sets. The two electrically conductive connection members are arranged in the housing and are respectively connected to the two electrically conductive cable sets. Each of the two electrically conductive cable sets has at least one electrically conductive cable and extends on two sides of the electrically conductive connection member in a horizontal direction. Each of the two electrically conductive connection members includes an electrically conductive terminal, a cable connection member, and a terminal holding member. The electrically conductive terminal is arranged in the housing. The electrically conductive terminal is integrally formed. The electrically conductive terminal has two leaf springs that are opposite to each other and a U-shaped connection part connected between the two leaf springs. Each of the two leaf springs has a base and a plurality of elastic contact arms, the plurality of elastic contact arms is connected to one side of the base, and a second socket is formed between the two leaf springs. The cable connection member is correspondingly connected to the electrically conductive terminal and the corresponding electrically conductive cable set. The cable connection member is bent and has a first connection part and a second connection part. The at least one electrically conductive cable is connected to the first connection part by soldering, and the second connection part is coupled to the U-shaped connection part. The terminal holding member is arranged in the housing and at a periphery of the electrically conductive terminal. The terminal holding member has two sheet bodies that are arranged opposite to each other and a plate-shaped connection part connected between two same sides of the two sheet bodies. A guide opening that is opposite to the plate-shaped connection part is formed on a side of the terminal holding member. The two sheet bodies are bent in a direction towards each other and a third socket is formed therebetween, and the third socket aligns with the second socket. When the electrically conductive terminal is assembled in the terminal holding member, the electrically conductive terminal is inserted into the terminal holding member through the guide opening. When the two electrically conductive connection members are assembled in the housing, the second sockets of the two electrically conductive terminals correspond to the two first sockets, and the second socket of each of the two electrically conductive terminals is connected to a corresponding one of the first socket.

In certain embodiments, the at least one electrically conductive cable has a cable main body and an electrically insulating material covering a periphery of the cable main body and has the electrically insulating material removed so as to expose the cable main body. The cable main body that is exposed and the first connection part of the cable connection member are connected by using molten tin to cover the exposed cable main body and at least a portion of the first connection part.

In certain embodiments, the electrical connector assembly further includes a groove body. The electrically conductive cable set has two electrically conductive cables that are arranged opposite to each other, and each of the two electrically conductive cables has a cable main body and an electrically insulating material covering a periphery of the cable main body. One terminal of each of the two electrically conductive cables has the electrically insulating material removed so as to expose the cable main body, the cable main bodies that are exposed from the two electrically conductive cables are arranged in the groove body. The groove body is filled with molten tin so as to cover the two exposed cable main bodies and at least a portion of the first connection part.

In certain embodiments, the electrically conductive connection member further has an insulating tape so as to cover the molten tin.

In certain embodiments, the electrical connector assembly further includes a groove body. The groove body has a first plate wall and a second plate wall that are opposite to each other, and a third plate wall connected between the first plate wall and the second plate wall. The first connection part of the cable connection member is coupled to the groove body and is arranged in the groove body.

In certain embodiments, at least one first engage hole is arranged between the first plate wall and the third plate wall, and at least one second engage hole is arranged between the third plate wall and the second plate wall. At least one first protrusion part corresponding to the at least one first engage hole and at least one second protrusion part corresponding to the at least one second engage hole are respectively arranged on two sides of the first connection part. The first connection part of the cable connection member is fixedly connected to the groove body through snap-fixing of the at least one first protrusion part and the at least one second protrusion part to the at least one first engage hole and the at least one second engage hole, respectively.

In certain embodiments, the electrically conductive connection member further has an insulating tape so as to cover the molten tin and the groove body.

In certain embodiments, when the electrically conductive terminal is not assembled in the terminal holding member, a width of the second socket is less than a width of the third socket.

In certain embodiments, the housing further has a first side wall and a second side wall that are opposite to each other, and the housing has a third side wall and a fourth side wall that are arranged between the first side wall and the second side wall and are opposite to each other. An inner side of the first side wall has two guide members, and each of the two guide members has a sliding groove and a bump arranged at one end of the sliding groove. The second side wall has two cantilever members, and each of the two cantilever members has a first terminal and a second terminal that are opposite to each other. The first terminal is connected to the second side wall, and the second terminal is overhung. A thickness of the second terminal is greater than a thickness of the first terminal.

In certain embodiments, the plate-shaped connection part abuts the second terminal of one of the two cantilever members.

In certain embodiments, the U-shaped connection part is arranged in one of the two sliding grooves and abuts a corresponding one of the bumps.

In certain embodiments, the housing further has a partition. The partition is arranged in the housing and is connected between the first side wall and the second side wall so as to divide an inside of the housing into a first accommodating space and a second accommodating space. The two electrically conductive connection members are respectively arranged in the first accommodating space and the second accommodating space. A first stop block and a second stop block are respectively arranged on two sides of the partition, a third stop block is arranged on an inner side of the third side wall, and a fourth stop block is arranged on an inner side of the fourth side wall. The first stop block and the third stop block are arranged in the first accommodating space, and the second stop block and the fourth stop block are arranged in the second accommodating space.

In certain embodiments, the terminal holding member further has two bent segments, and each of the two bent segments is adjacent to the guide opening and is arranged in the corresponding sheet body. When one of the two electrically conductive connection members is assembled in the first accommodating space, the two bent segments of the terminal holding member of the one of the two electrically conductive connection members respectively abut the first stop block and the third stop block. When another one of the two electrically conductive connection members is assembled in the second accommodating space, the two bent segments of the terminal holding member of the another one of the two electrically conductive connection members respectively abut the second stop block and the fourth stop block.

In certain embodiments, the electrical connector assembly further includes a cover detachably disposed on the side of the housing that has the opening.

In certain embodiments, the terminal holding member further has two through holes, the electrically conductive terminal further has two cantilever hooks corresponding to the two through holes, and each of the two cantilever hooks is arranged between the base and the plurality of elastic contact arms. When the electrically conductive terminal is assembled in the terminal holding member, the electrically conductive terminal is inserted into the terminal holding member through the guide opening, and each of the two cantilever hooks is engaged to the corresponding through hole.

In certain embodiments, each of the two cantilever hooks has an inclined surface, and the inclined surface extends and inclines inwardly in an insertion direction along which the electrically conductive terminal is inserted into the terminal holding member.

Therefore, one of the beneficial effects of the present disclosure is that, by virtue of "the two electrically conductive connection members being arranged in the housing and respectively connected to the two electrically conductive cable sets, and each of the two electrically conductive cable sets extending on two sides of the electrically conductive connection member in the horizontal direction", "the electrically conductive cable being connected to the first connection part by soldering, and the second connection part being coupled to the U-shaped connection part", and "the terminal holding member having the two sheet bodies that are arranged opposite to each other and the plate-shaped connection part connected between two same sides of the two sheet bodies, and the guide opening that is opposite to the plate-shaped connection part being formed on the side of the terminal holding member", a quantity of internal components and assembly process can be simplified in the electrical connector assembly provided by the present disclosure, and a structural strength of the electrical connector assembly after assembly can be enhanced, such that the internal components can be prevented from loosening or shifting after repeated use.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
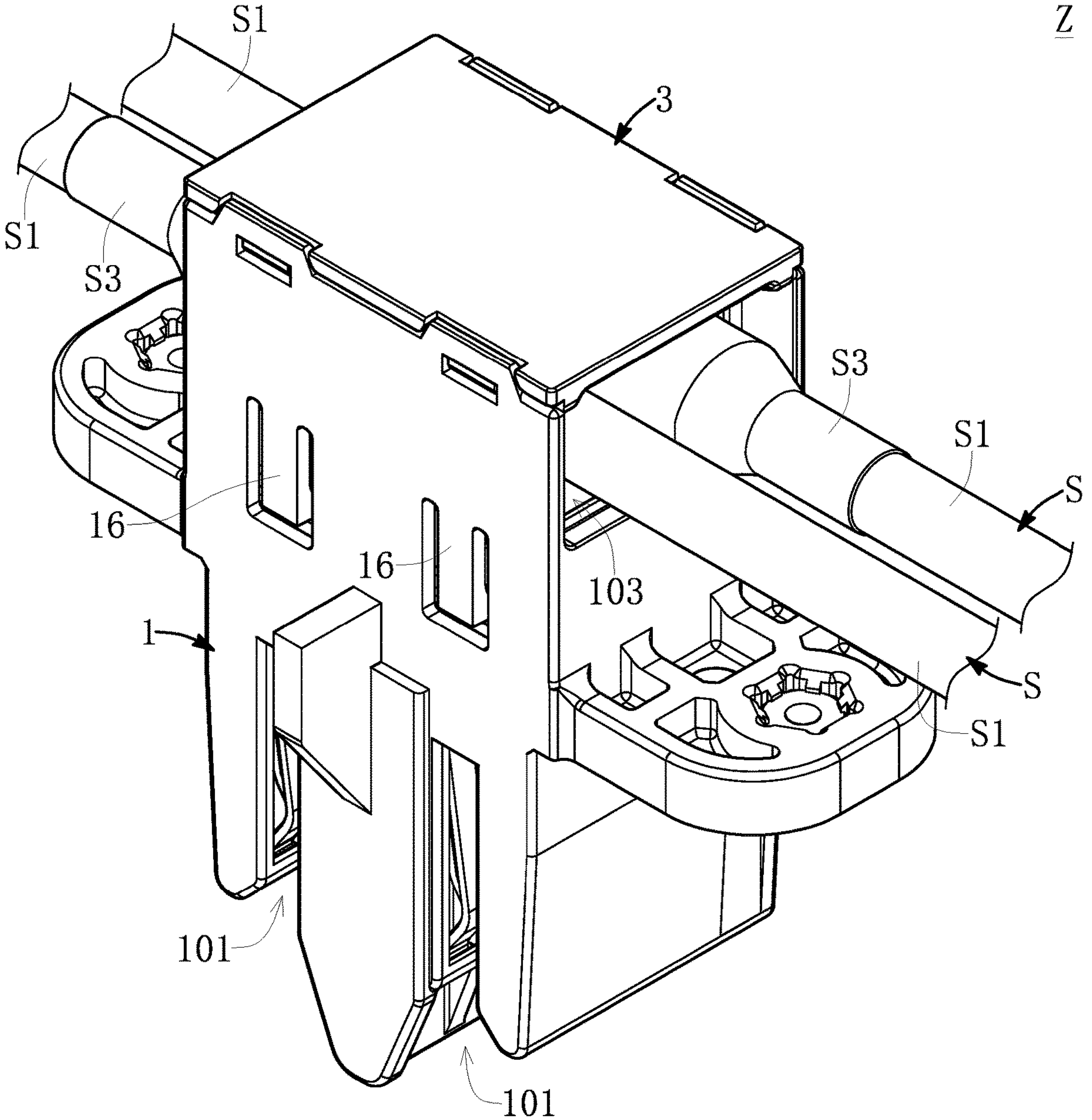
FIG. 1 is a schematic perspective view of an electrical connector assembly according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Embodiments

Figure 2:
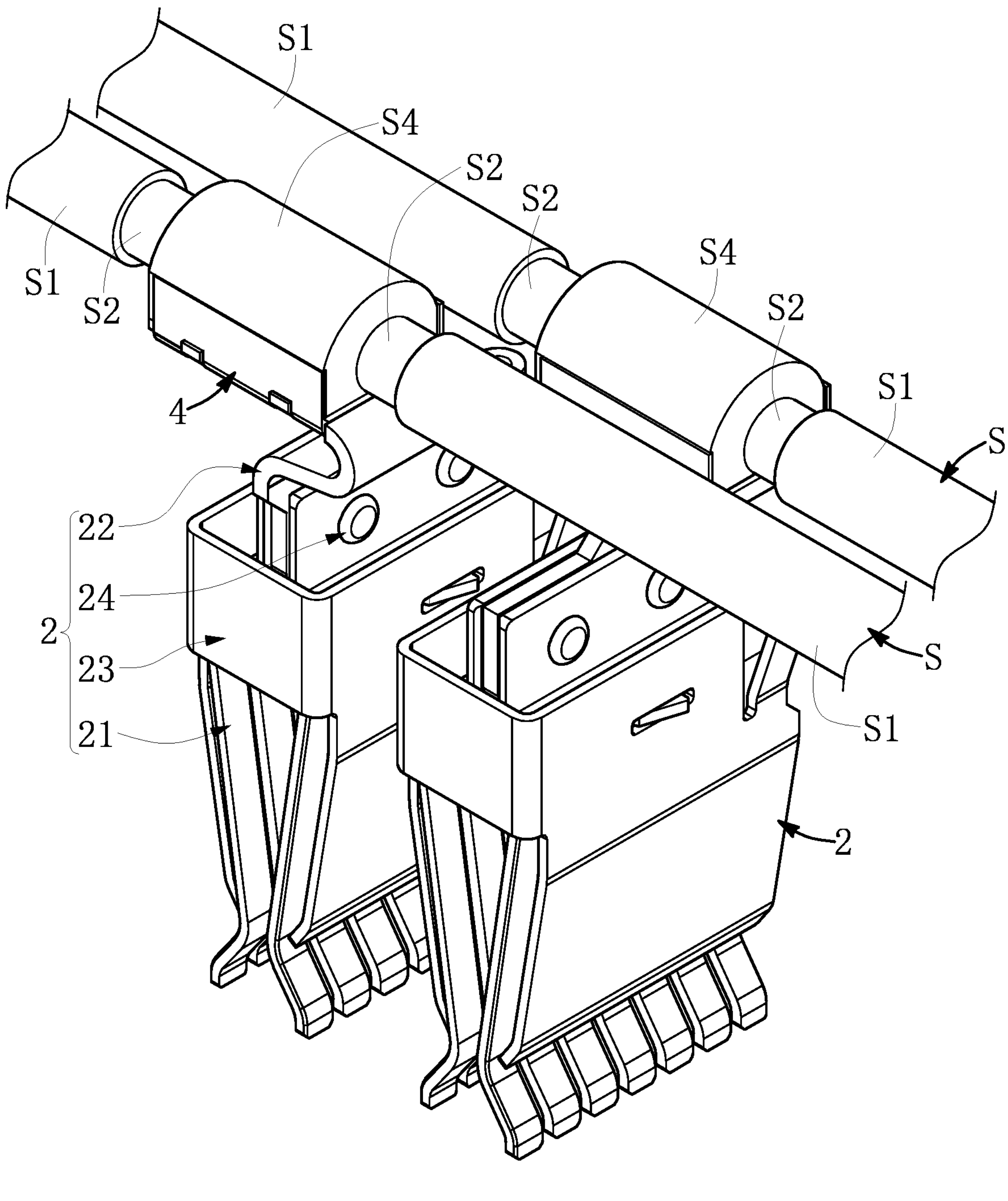
FIG. 2 is a schematic perspective view of an electrically conductive connection member of the electrical connector assembly according to the present disclosure.

Referring to FIG. 1 and FIG. 2, FIG. 1 is a schematic perspective view of an electrical connector assembly according to the present disclosure, and FIG. 2 is a schematic perspective view of an electrically conductive connection member of the electrical connector assembly according to the present disclosure. One embodiment of the present disclosure provides an electrical connector assembly Z including a housing 1, two electrically conductive connection members 2, two electrically conductive cable sets, and a cover 3. Each of the two electrically conductive connection members 2 has an electrically conductive terminal 21, a cable connection member 22, and a terminal holding member 23. Two terminals of the cable connection member 22 are respectively connected to the two electrically conductive cable sets and the electrically conductive terminal 21. The terminal holding member 23 is engaged to the electrically conductive terminal 21. It should be noted that the two electrically conductive connection members 2 are arranged in the housing 1 and are respectively connected to the two electrically conductive cable sets. Each of the two electrically conductive cable sets has at least one electrically conductive cable S, and the at least one electrically conductive cable S extends on two sides of the electrically conductive connection member 2 in a horizontal direction and correspondingly passes through two lateral openings 103 on two sides of the electrical connector assembly Z. One of the beneficial effects of a configuration of the electrical connector assembly Z of the present disclosure is that, if one of the two electrically conductive cable sets is a ground line and another one is a power line, each of the two sides of the electrical connector assembly Z can simultaneously have the ground line and the power line. That is, each of the two sides of the electrical connector assembly Z can simultaneously provide power and ground potentials to an electronic device connected thereto. In contrast with the electrical connector assembly Z, the ground line and the power line of a conventional electrical connector assembly are respectively arranged on two sides of conventional electrical connector assemblies (i.e., the ground line being on one of two sides of the conventional electrical connector assemblies and the power line being on another one of the two sides of the conventional electrical connector assemblies). Therefore, when an electronic device is correspondingly connected to the power line and the ground line of the conventional electrical connector assembly, an extra space for cable arrangement is necessary. In other words, through a structural design of the electrical connector assembly Z of the present disclosure, the space occupied by an arrangement of the cables can be effectively reduced, and more space is available for other components.

Figure 3:
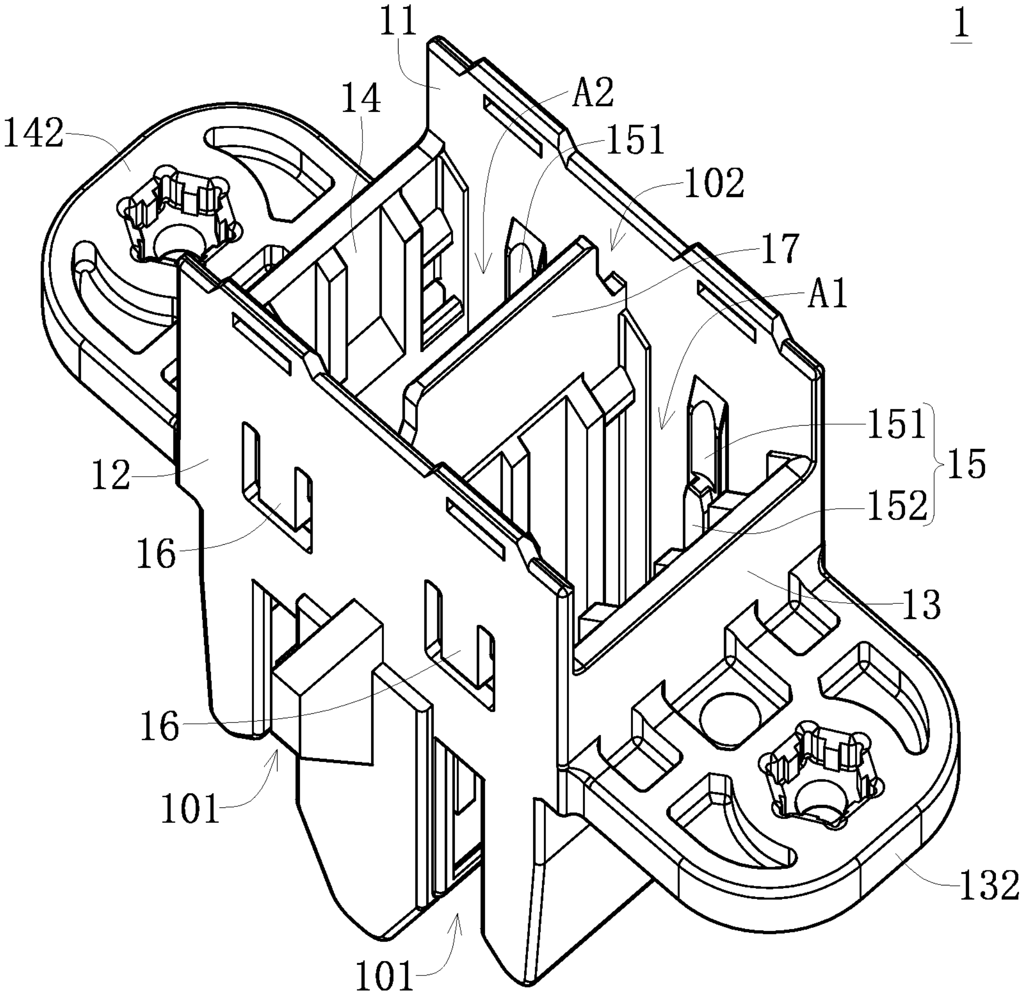
FIG. 3 is a schematic perspective view of a housing of the electrical connector assembly according to the present disclosure.
Figure 4:
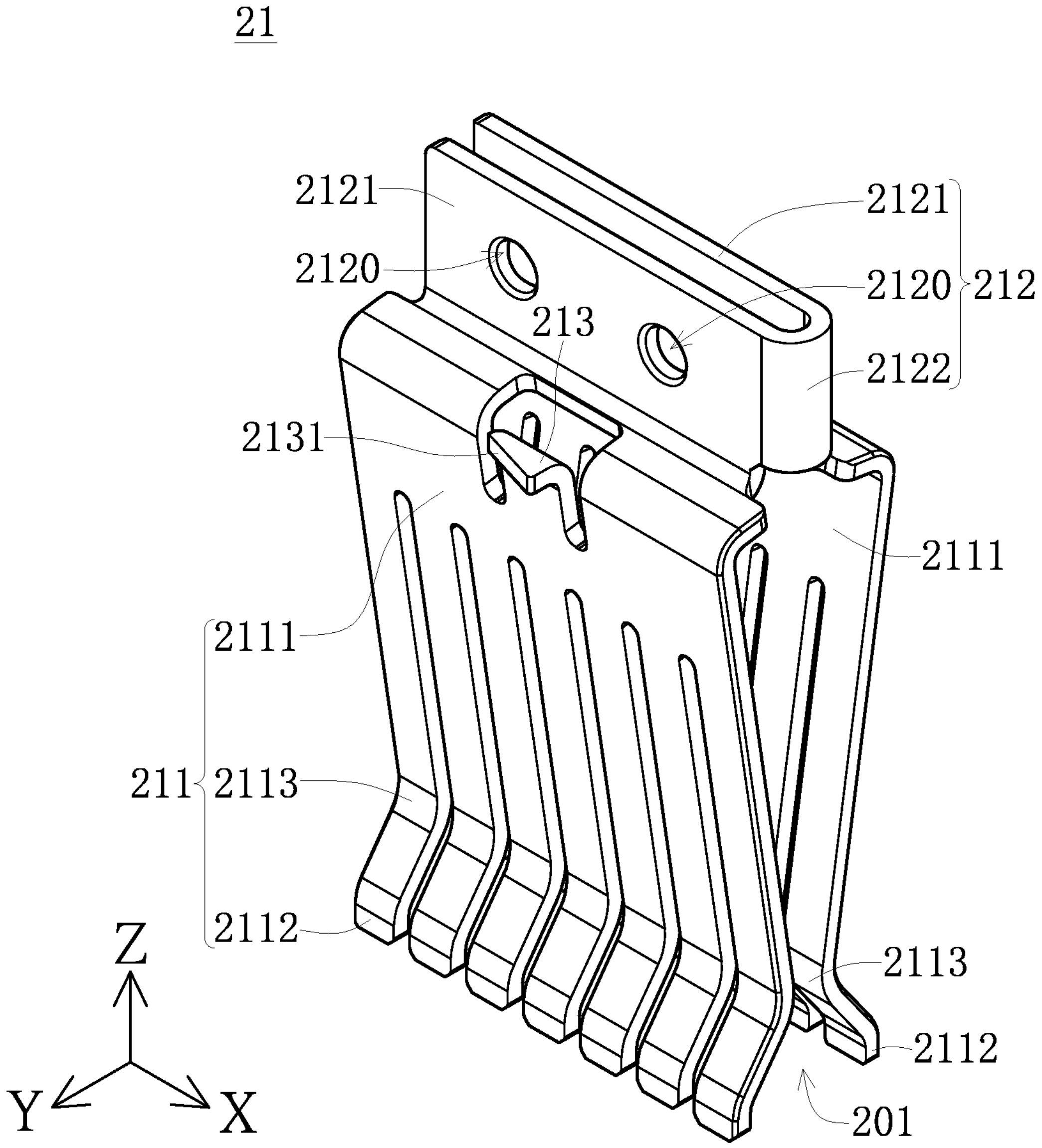
FIG. 4 is a schematic perspective view of the electrically conductive terminal of the electrical connector assembly according to the present disclosure.

Referring to FIG. 1 to FIG. 4, FIG. 3 is a schematic perspective view of the housing of the electrical connector assembly according to the present disclosure, and FIG. 4 is a schematic perspective view of the electrically conductive terminal of the electrical connector assembly according to the present disclosure. One of two opposite sides of the housing 1 has two sockets 101, and another one has an opening 102. The two electrically conductive connection members 2 can be inserted into the housing 1 through the opening 102. The cover 3 is detachably disposed on the side where the housing 1 has the opening 102. The housing 1 has a first side wall 11 and a second side wall 12 that are opposite to each other, and the housing 1 has a third side wall 13 and a fourth side wall 14 that are arranged between the first side wall 11 and the second side wall 12 and are opposite to each other. An inner side of the first side wall 11 has two guide members 15. Each of the two guide members 15 has a sliding groove 151 and a bump 152 arranged at one end of the sliding groove 151. The second side wall 12 has two cantilever members 16, and the two cantilever members 16 are respectively arranged opposite to the two guide members 15. Furthermore, the housing 1 is formed by having the first side wall 11, the second side wall 12, the third side wall 13, and the fourth side wall 14. An inside of the housing 1 has a hollow cavity so as to accommodate the two electrically conductive connection members 2. Furthermore, the housing 1 has a partition 17 connected between the first side wall 11 and the second side wall 12, so as to divide the inside of the housing 1 into a first accommodating space A1 and a second accommodating space A2. The two electrically conductive connection members 2 are respectively arranged in the first accommodating space A1 and the second accommodating space A2. In addition, the housing 1 has two wings 132, 142 respectively arranged on the third side wall 13 and the fourth side wall 14. Each of the two wings 132, 142, has a threaded hole, such that a screw member can be inserted into the threaded hole for fixing the electrical connector assembly Z to a proper position.

Referring to FIG. 3 and FIG. 4, the electrically conductive terminal 21 is arranged in the housing 1. The electrically conductive terminal 21 is integrally formed. The electrically conductive terminal 21 has two leaf springs 211 that are opposite to each other and a U-shaped connection part 212 connected between the two leaf springs 211. Each of the two leaf springs 211 has a base 2111 and a plurality of elastic contact arms 2112, and the plurality of elastic contact arms 2112 are connected to a side of the base 2111. Since the two leaf springs 211 are arranged opposite to each other, the two leaf springs 211 each have the plurality of elastic contact arms 2112 arranged opposite to each other. That is, the plurality of elastic contact arms 2112 of one of the two leaf springs 211 is arranged opposite to the plurality of elastic contact arms 2112 of another one of the two leaf springs 211, and a second socket 201 is formed between the two leaf springs 211.

Figure 5:
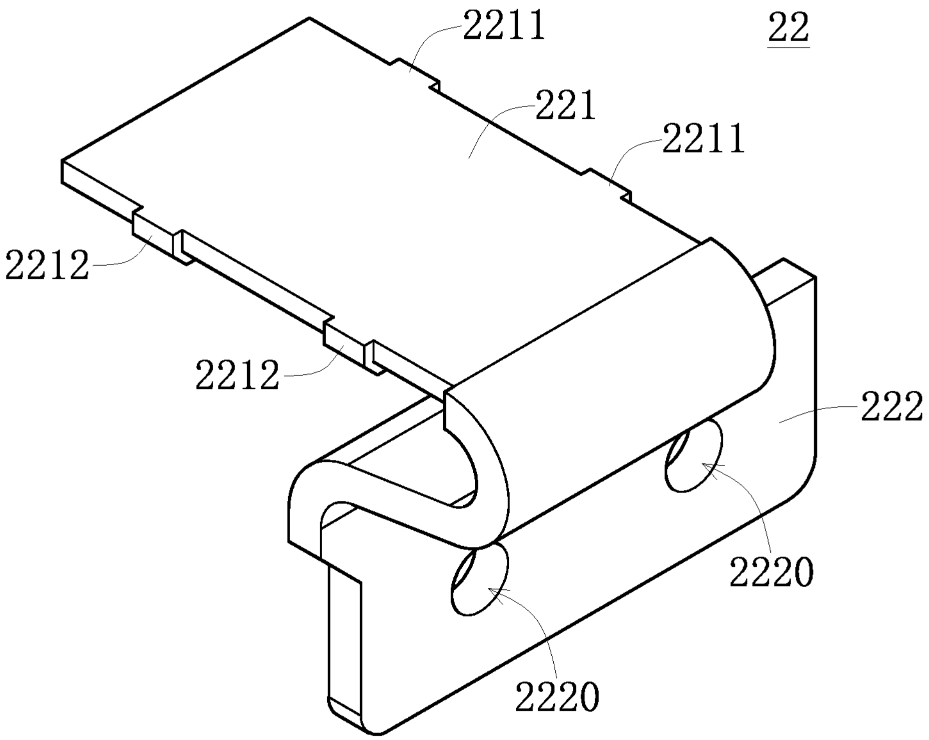
FIG. 5 is a schematic perspective view of a cable connection member of the electrical connector assembly according to the present disclosure.
Figure 6:
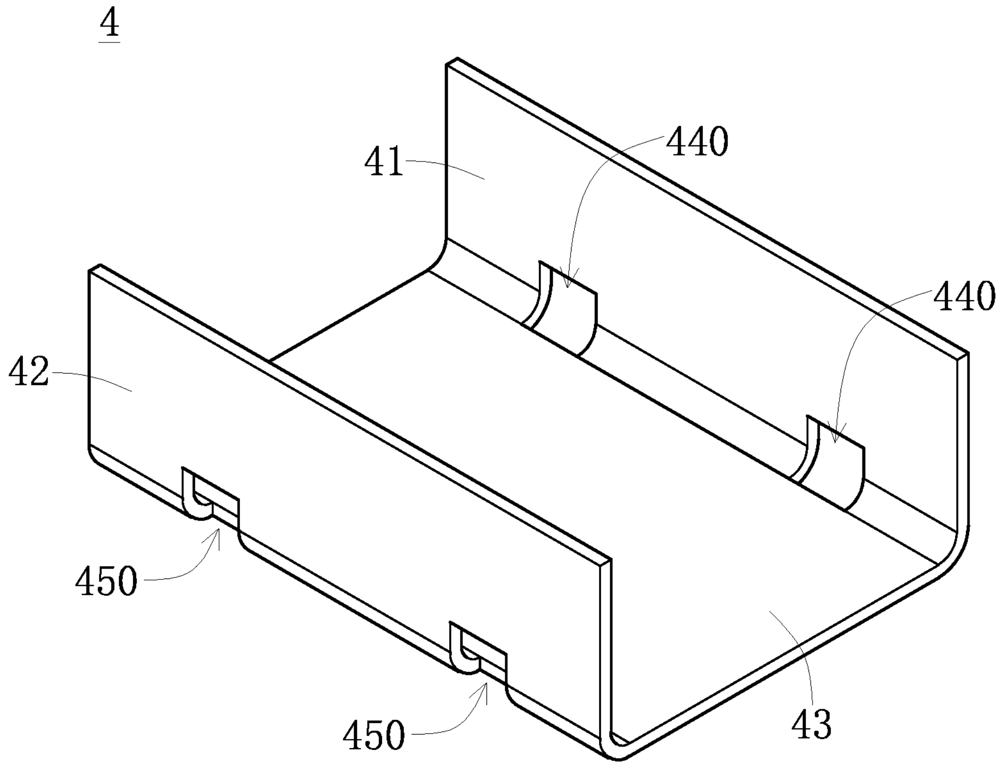
FIG. 6 is a schematic perspective view of a groove body of the electrical connector assembly according to the present disclosure.

Referring to FIG. 2, FIG. 5, and FIG. 6, FIG. 5 is a schematic perspective view of the cable connection member of the electrical connector assembly according to the present disclosure, and FIG. 6 is a schematic perspective view of a groove body of the electrical connector assembly according to the present disclosure. The cable connection member 22 is correspondingly connected to the electrically conductive terminal 21 and the corresponding electrically conductive cable set. The cable connection member 22 is bent relative to a vertical axis, and has a first connection part 221 and a second connection part 222. The first connection part 221 and the second connection part 222 each have a plane that is roughly perpendicular to each other. The electrically conductive cable S is connected to the first connection part 221 by soldering, and the second connection part 222 is coupled to the U-shaped connection part 212. The electrical connector assembly Z further includes a groove body 4. The groove body 4 has a first plate wall 41 and a second plate wall 42 that are opposite to each other, and a third plate wall 43 connected between the first plate wall 41 and the second plate wall 42. The first connection part 221 of the cable connection member 22 is coupled to the groove body 4 and is arranged in the groove body 4. For example, in the groove body 4, at least one first engage hole 440 is arranged between the first plate wall 41 and the third plate wall 43, and at least one second engage hole 450 is arranged between the third plate wall 43 and the second plate wall 42 (e.g., in the present embodiment, a quantity of the first engage holes 440 and a quantity of the second engage holes 450 both are two). At least one first protrusion part 2211 corresponding to the at least one first engage hole 440 and at least one second protrusion part 2212 corresponding to the at least one second engage hole 450 are respectively arranged on two sides of the first connection part 221 (e.g., in the present embodiment, a quantity of the first protrusion parts 2211 and a quantity of the second protrusion parts 2212 both are two). The first connection part 221 of the cable connection member 22 is fixedly connected to the groove body 4 through snap-fixing of the at least one first protrusion part 2211 and the at least one second protrusion part 2212 to the at least one first engage hole 440 and the at least one second engage hole 450, respectively. However, the present disclosure is not limited to a way of coupling between the first connection part 221 and the groove body 4.

Figure 7:
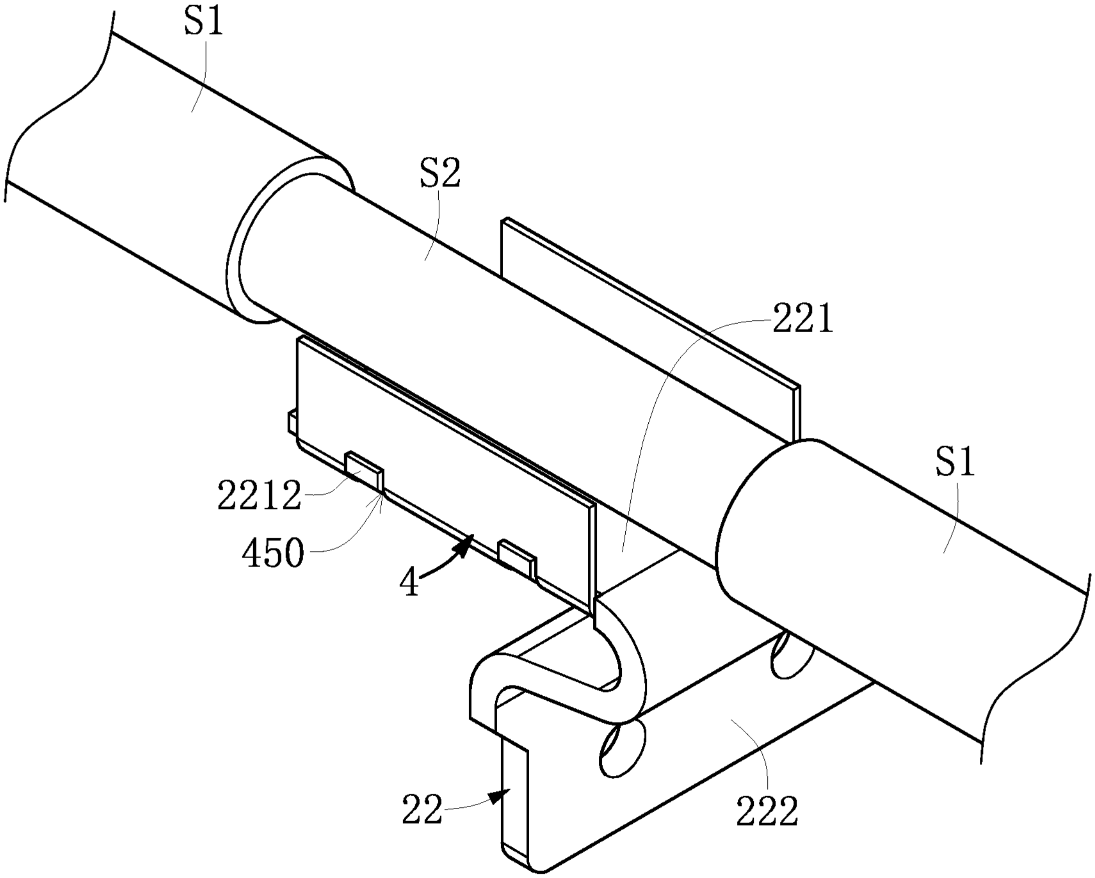
FIG. 7 is a schematic view of an electrically conductive cable of the electrical connector assembly according to one embodiment of the present disclosure.
Figure 8:
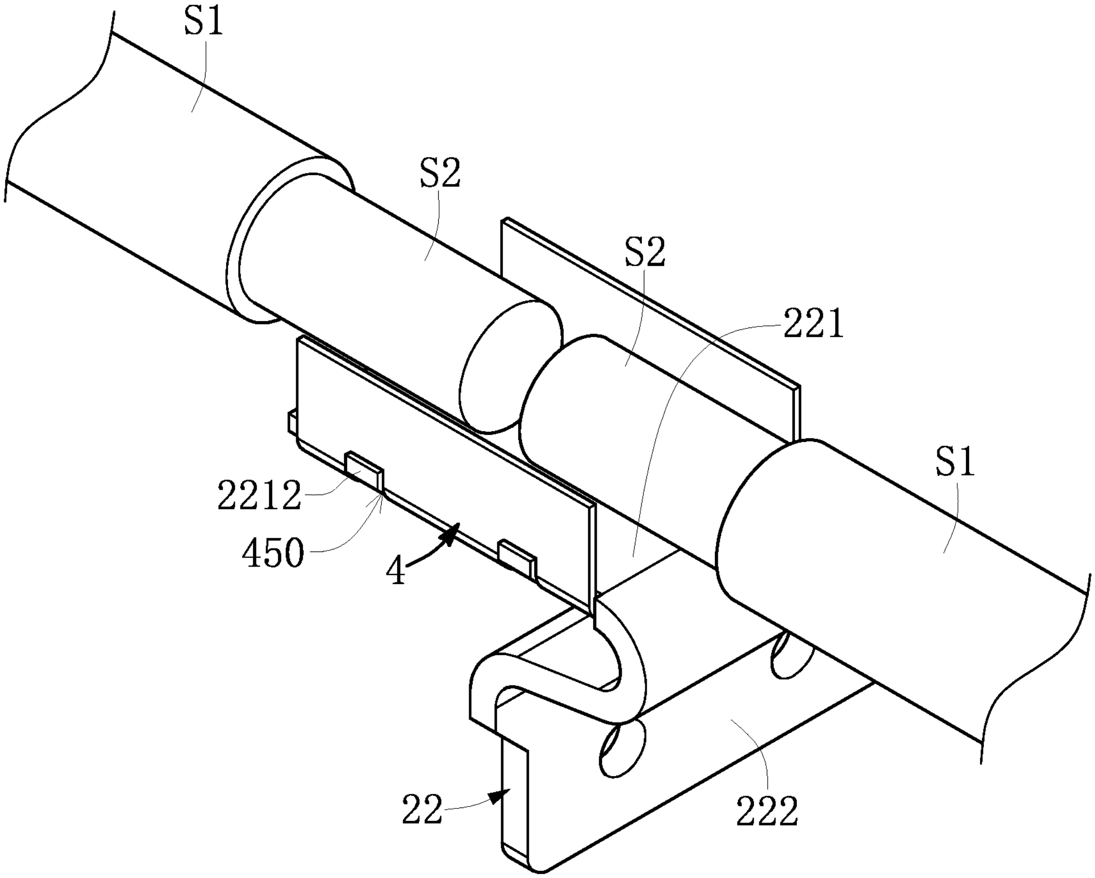
FIG. 8 is another schematic view of the electrically conductive cable of the electrical connector assembly according to one embodiment of the present disclosure.
Figure 9:
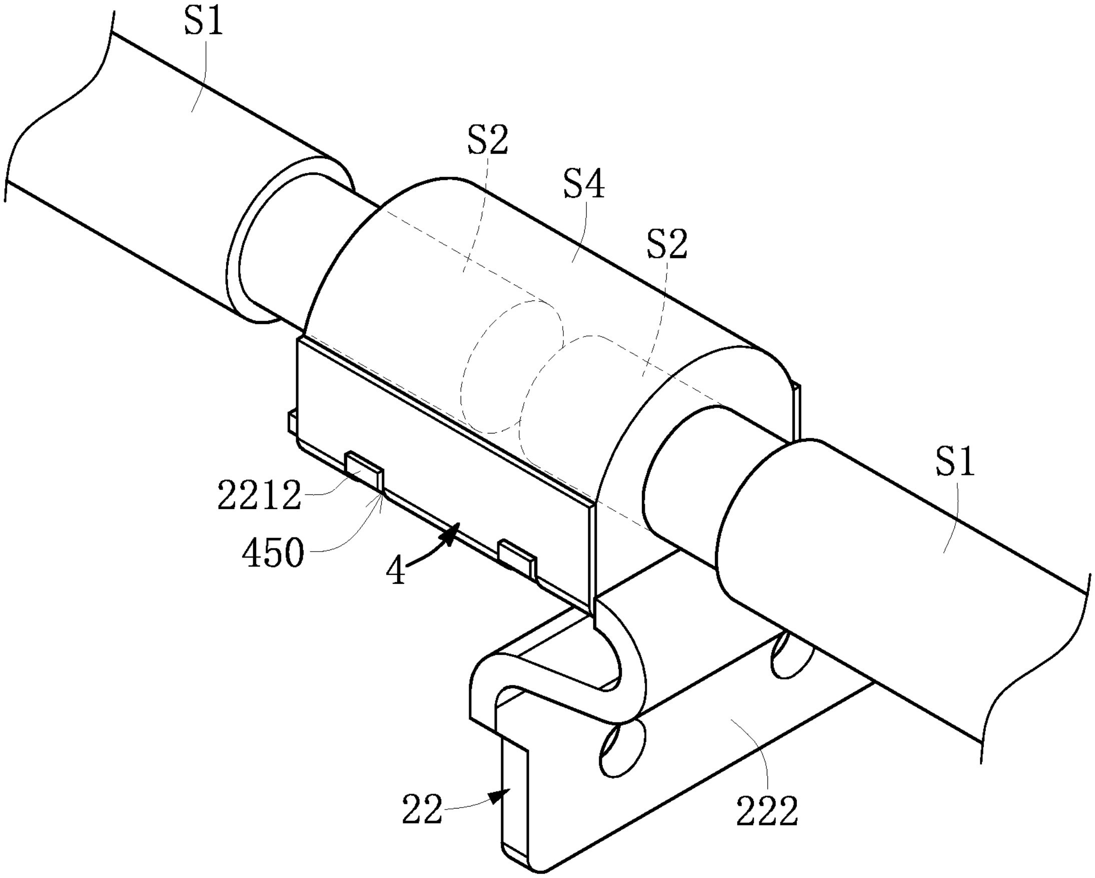
FIG. 9 is a schematic view illustrating a connection of the cable connection member to the electrically conductive cable in the electrical connector assembly according to the present disclosure.
Figure 12:
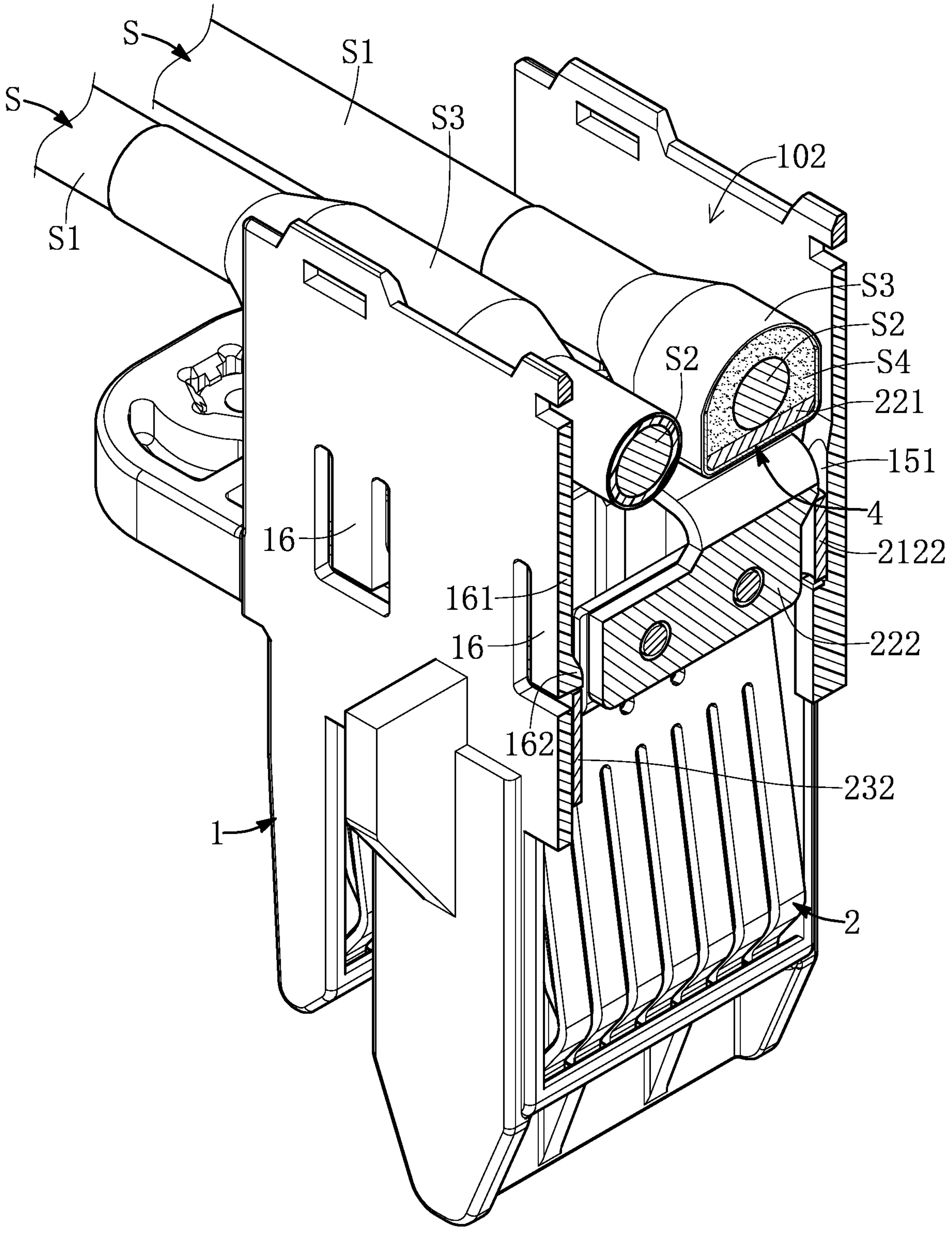
FIG. 12 is a cross-sectional view taken along line XII-XII of FIG. 11.

Referring to FIG. 7 to FIG. 9, FIG. 7 is a schematic view of the electrically conductive cable of the electrical connector assembly according to one embodiment of the present disclosure, FIG. 8 is another schematic view of the electrically conductive cable of the electrical connector assembly according to one embodiment of the present disclosure, and FIG. 9 is a schematic view illustrating a connection of the cable connection member to the electrically conductive cable in the electrical connector assembly according to the present disclosure. As mentioned above, the electrically conductive cable set has the at least one electrically conductive cable S. The electrically conductive cable S has a cable main body S2 and an electrically insulating material S1 covering a periphery of the cable main body S2. When the electrically conductive cable S is connected to the first connection part 221 of the cable connection member 22 by soldering, a portion of the electrically conductive cable S connected to the first connection part 221 is arranged in the groove body 4. Referring to FIG. 7, a middle portion of the electrically insulating material S1 of the electrically conductive cable S is removed so as to expose the cable main body S2, and the cable main body S2 that is exposed is arranged in an inside of the groove body 4. The inside of the groove body 4 is filled with molten tin S4 so as to cover the cable main body S2 that is exposed and at least a portion of the first connection part 221. In this way, the groove body 4 can be used to hold the molten tin S4, so that the molten tin S4 can be fixed in an area to prevent overflow. Referring also to FIG. 12, the electrically conductive connection member 2 also has an insulating tape S3, and the electrically conductive connection member 2 covers the solidified molten tin S4 and the groove body 4 through the insulating tape S3. It is worth mentioning that, in another embodiment of the present disclosure, the groove body 4 can also be omitted. That is to say, the electrically conductive cable S is connected to the first connection part 221 of the cable connection member 22 by soldering through the molten tin S4, and then a soldered portion is covered directly with the insulating tape S3 after the molten tin S4 has solidified.

Referring to FIG. 8 and FIG. 9, in still another embodiment of the present disclosure, the electrically conductive cable set has two electrically conductive cables S that are arranged opposite to each other, and each of the two electrically conductive cables S has the cable main body S2 and the electrically insulating material S1 covering a periphery of the cable main body S2. Before connecting to the first connection part 221, the electrically insulating material S1 at one terminal of each of the electrically conductive cables S is removed so as to expose the cable main body S2 therein. Then, the cable main bodies S2 that are exposed from two electrically conductive cables S are arranged in opposite direction into an inside of the groove body 4. Finally, the two electrically conductive cables S are respectively connected to the first connection part 221 of the cable connection member 22 by soldering. The inside of the groove body 4 is filled with molten tin S4 so as to cover the two cable main bodies S2 that are exposed and at least a portion of the first connection part 221.

Figure 10:
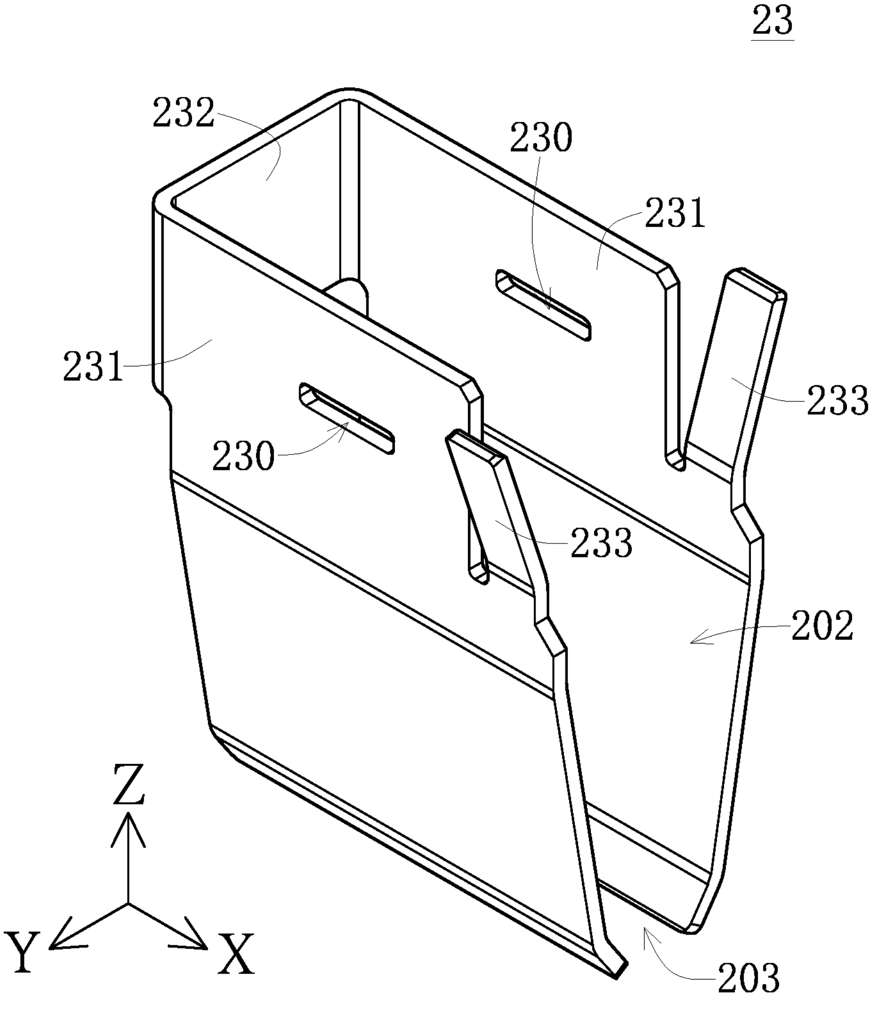
FIG. 10 is a schematic perspective view of a terminal holding member of the electrical connector assembly according to the present disclosure.

Referring to FIG. 2 and FIG. 10, FIG. 10 is a schematic perspective view of the terminal holding member of the electrical connector assembly according to the present disclosure. The terminal holding member 23 is arranged in the housing 1 and at a periphery of the electrically conductive terminal 21. The terminal holding member 23 has two sheet bodies 231 that are arranged opposite to each other and a plate-shaped connection part 232 connected between two same sides of the two sheet bodies 231. Accordingly, as shown in FIG. 10, in a top view (i.e., in a direction of a negative Z-axis), the terminal holding member 23 is U-shaped, and a guide opening 202 that is opposite to the plate-shaped connection part 232 is formed on a side of the terminal holding member 23. In addition, the two sheet bodies 231 are respectively bent along directions towards each other when extending from the top (i.e., in the direction of the negative Z-axis), and a third socket 230 is formed therebetween.

Referring to FIG. 4 and FIG. 10, the terminal holding member 23 further has two through holes 230, the electrically conductive terminal 21 further has two cantilever hooks 213 corresponding to the two through holes 230, and each of the two cantilever hooks 213 is arranged on the base 2111. Therefore, when the electrically conductive terminal 21 is inserted into the terminal holding member 23 through the guide opening 202, each of the two cantilever hooks 213 is engaged to the corresponding through hole 230. Furthermore, a terminal of each of the two cantilever hooks 213 has an inclined surface 2131, and the inclined surface 2131 extends and inclines inwardly along a direction of a negative X-axis. When the electrically conductive terminal 21 is assembled in the terminal holding member 23, the electrically conductive terminal 21 is inserted into the terminal holding member 23 through the guide opening 202. Furthermore, the electrically conductive terminal 21 is inserted into the terminal holding member 23 through the guide opening 202 along the direction of the negative X-axis. In other words, the inclined surface 2131 of one of the two cantilever hooks 213 extends and inclines inwardly along an insertion direction of the electrically conductive terminal 21 into the terminal holding member 23, or the inclined surface 2131 extends and expands outwardly along a direction of a positive X-axis, i.e., a distance between the two inclined surfaces 2131 corresponding to the two cantilever hooks 213 changes from being narrow to being wide in the positive direction along the X-axis. In this way, the electrically conductive terminal 21 can be smoothly inserted into the terminal holding member 23, and a resistance between the two sheet bodies 231 of the terminal holding member 23 and terminal surfaces corresponding to the two cantilever hooks 213 can be reduced. In addition, when the electrically conductive terminal 21 is inserted into the terminal holding member 23, the third socket 203 aligns with the second socket 201.

It is worth mentioning that, in the present disclosure, when the electrically conductive terminal 21 is not assembled in the terminal holding member 23, a width of the second socket 201 is less than a width of the third socket 203. The width of the second socket 201 can be defined as a distance between two contacts 2113 plus a thickness of the two elastic contact arms 2112, wherein the two contact areas 2113 are two areas of the two elastic contract arms 2112 with a closest distance therebetween. The width of the third socket 203 can be defined as a closest distance between the two sheet bodies 231 when the two sheet bodies 231 are respectively bent along the directions towards each other. In other words, since the width of the second socket 201 is less than the width of the third socket 203 when the electrically conductive terminal 21 is not assembled in the terminal holding member 23, the electrically conductive terminal 21 does not particularly push out the terminal holding member 23 and the terminal holding member 23 does not particularly apply a positive force to two sides of the electrically conductive terminal 21 to clamp the electrically conductive terminal 21 when the electrically conductive terminal 21 is assembled in the terminal holding member 23 and a plug (not shown) is not being inserted into the second socket 201. In contrast, conventional terminal clamps are inherently flexible, such that the conventional terminal clamps as the terminal holding members of the present disclosure apply the positive force to two sides of electrically conductive terminals to clamp the electrically conductive terminals when the conventional terminal clamps are assembled with the electrically conductive terminals, thereby causing difficulties during assembly. In other words, compared with the conventional technology, a design of the electrically conductive terminal 21 and the terminal holding member 23 of the present disclosure allows users to perform assembly more easily.

Figure 11:
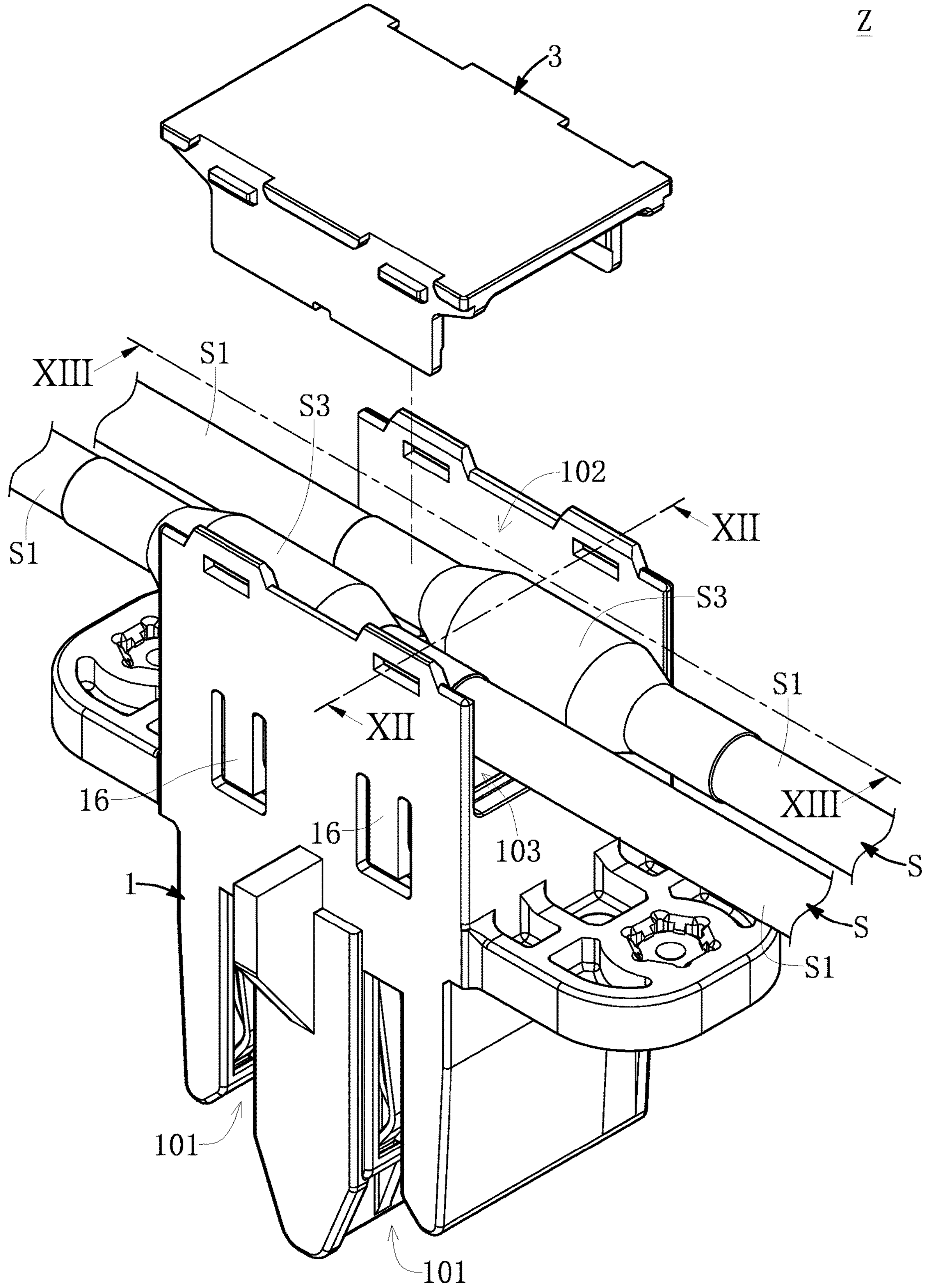
FIG. 11 is a schematic exploded view of the electrical connector assembly according to the present disclosure.

As mentioned above, the U-shaped connection part 212 of the electrically conductive terminal 21 has two bar-shaped arms 2121 and a U-shaped arm 2122. The two bar-shaped arms 2121 are respectively connected to the two bases 2111 of the two leaf springs 211, and the U-shaped arm 2122 is connected between two same sides of the two bar-shaped arms 2121. When the electrically conductive terminal 21 is assembled in the terminal holding member 23, the U-shaped arm 2122 and the plate-shaped connection part 232 are respectively arranged on two opposite sides of the electrically conductive connection member 2. Referring to FIG. 2 and FIG. 5, the electrically conductive connection member 2 has at least one fastener 24, and each of the two bar-shaped arms 2121 has at least one first through hole 2120 that corresponds to each other. The second connection part 222 of the cable connection member 22 is arranged between the two bar-shaped arms 2121, and the second connection part 222 has at least one second through hole 2220. The at least one first through holes 2120 of each of the bar-shaped arms 2121 is aligned with the at least one second through hole 2220. The at least one fastener 24 of the electrically conductive connection member 2 passes through the at least one second through hole 2220 and the two of the first through holes 2120, such that the second connection part 222 is fixed on the U-shaped connection part 212. The present disclosure is not limited to a type of the fastener 24 and, for example, the fastener 24 can be a rivet. At least one rivet of the electrically conductive connection member 2 passes through the at least one second through hole 2220 and the two of the first through holes 2120, such that the second connection part 222 is fixed on the U-shaped connection part 212. In addition, the first connection part 221 of the cable connection member 22 is in a shape of a flat plate, and the cable main body S2 that is exposed at the one terminal or the middle portion of the electrically conductive cable S contacts and is arranged on the first connection part 221. Furthermore, the first connection part 221 is filled with the molten tin S4, and the cable main body S2 that is exposed and the at least a portion or all of the first connection part 221 are covered for a soldering process. Thereby, the electrically conductive connection member 2 is electrically connected to the electrically conductive cable S. Referring to FIG. 2, FIG. 4, and FIG. 11, FIG. 11 is a schematic exploded view of the electrical connector assembly according to the present disclosure. When the two electrically conductive connection members 2 are inserted into and assembled in the housing 1 through the opening 102, the second sockets 201 of the two electrically conductive connection members 2 correspond to the two first sockets 101, and the second socket 201 of each of the two electrically conductive terminals 21 is communicated with the corresponding first socket 101.

Figure 13:
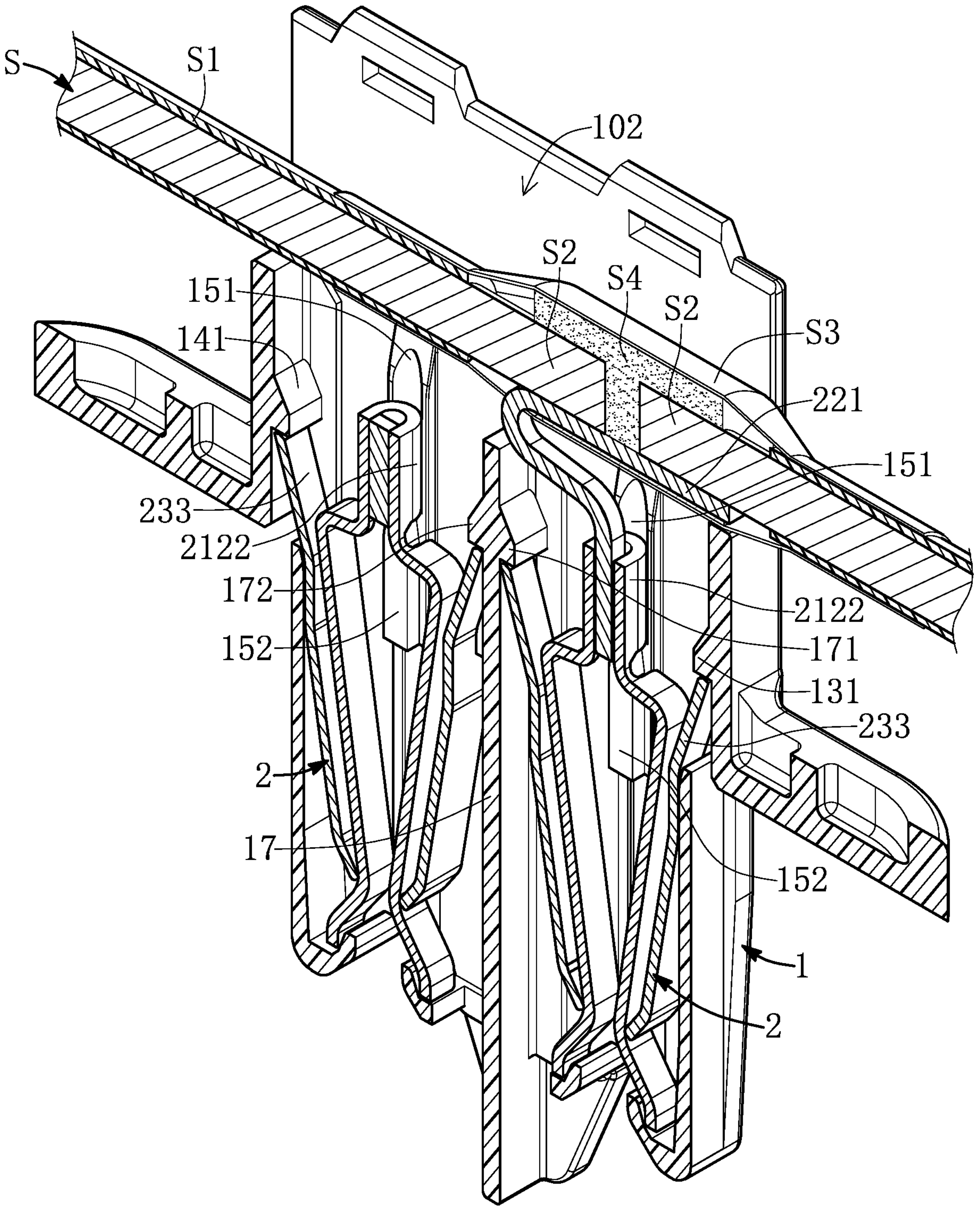
FIG. 13 is a cross-sectional view taken along line XIII-XIII of FIG. 11.

Referring to FIG. 11 to FIG. 13, in conjunction with FIG. 3, FIG. 12 is a cross-sectional view taken along line XII-XII of FIG. 11, and FIG. 13 is a cross-sectional view taken along line XIII-XIII of FIG. 11. A first stop block 171 and a second stop block 172 are respectively arranged on two sides of the partition 17, a third stop block 131 is arranged on an inner side of the third side wall 13, and a fourth stop block 141 is arranged on an inner side of the fourth side wall 14. The first stop block 171 and the third stop block 131 are arranged in the first accommodating space A1, and the second stop block 172 and the fourth stop block 141 are arranged in the second accommodating space A2. As shown in FIG. 12, each of the two cantilever members 16 has a first terminal 161 and a second terminal 162 that are opposite to each other. The first terminal 161 is connected to the second side wall 12, the second terminal 162 is overhung, and a thickness of the second terminal 162 is greater than a thickness of the first terminal 161. Moreover, a free terminal of the cantilever member 16 protrudes inwardly.

According to the above and referring to FIG. 10, the terminal holding member 23 further has two bent segments 233. Each of the two bent segments 233 is adjacent to the guide opening 202 and is connected to a corresponding one of the two sheet bodies 231. When one of the two electrically conductive connection members 2 is assembled in the first accommodating space A1, the two bent segments 233 of the terminal holding member 23 of the one of the two electrically conductive connection members 2 respectively abut the first stop block 171 and the third stop block 131, the plate-shaped connection part 232 abuts the corresponding second terminal 162 of the two cantilever members 16, and the U-shaped arm 2122 of the U-shaped connection part 212 is arranged in the sliding groove 151 of the first accommodating space A1 and abuts a corresponding one of the bumps 152. When another one of the two electrically conductive connection members 2 is assembled in the second accommodating space A2, the two bent segments 233 of the terminal holding member 23 of the another one of the two electrically conductive connection members 2 respectively abut the second stop block 172 and the fourth stop block 141, and similarly, the plate-shaped connection part 232 abuts the corresponding second terminal 162 of the two cantilever members 16, and the U-shaped arm 2122 is arranged in the sliding groove 151 of the second accommodating space A2 and abuts a corresponding one of the bumps 152.

Beneficial Effects of the Embodiments

In conclusion, one of the beneficial effects of the present disclosure is that, by virtue of "the two electrically conductive connection members 2 being arranged in the housing 1 and respectively connected to the two electrically conductive cable sets, and the electrically conductive cable S of each of the two electrically conductive cable sets extending on two sides of the electrically conductive connection member 2 in the horizontal direction", "the electrically conductive cable S being connected to the first connection part 221 by soldering, and the second connection part 222 being coupled to the U-shaped connection part 212", and "the terminal holding member 23 having the two sheet bodies 231 that are arranged opposite to each other and the plate-shaped connection part 232 connected between the same sides of the two sheet bodies 231, and the guide opening 202 that is opposite to the plate-shaped connection part 232 being formed on the side of the terminal holding member 23", a quantity of internal components and an assembly process can be simplified in the electrical connector assembly Z provided by the present disclosure, and a structural strength of the electrical connector assembly after assembly can be enhanced, such that the internal components can be prevented from loosening or shifting after repeated use.

Furthermore, the two electrically conductive connection members 2 are arranged in the housing 1 and are respectively connected to the two electrically conductive cable sets. The electrically conductive cable S of each of the two electrically conductive cable sets extends on two sides of the electrically conductive connection member 2 in the horizontal direction. The beneficial effects of such configuration of the electrical connector assembly Z is that, if one of the two electrically conductive cable sets is the ground line and another one of the two electrically conductive cable sets is the power line, each of the two sides of the electrical connector assembly Z can simultaneously have the ground line and the power line. The space occupied by an arrangement of the cables can be effectively reduced, and more space is available for other components.

Furthermore, the terminal of each of the cantilever hooks 213 has the inclined surface 2131, and the inclined surface 2131 extends and inclines inwardly along the direction of the negative X-axis, or the inclined surface 2131 extends and expands outwardly along the direction of the positive X-axis, i.e., the distance between the two inclined surfaces 2131 corresponding to the two cantilever hooks 213 changes from being narrow to being wide in the positive direction along the X-axis. In this way, the electrically conductive terminal 21 can be smoothly inserted into the terminal holding member 23, and the resistance between the two sheet bodies 231 of the terminal holding member 23 and the terminal surfaces corresponding to the two cantilever hooks 213 can be reduced. In addition, when the electrically conductive terminal 21 is inserted into the terminal holding member 23, the third socket 203 aligns with the second socket 201.

Furthermore, in the present disclosure, when the electrically conductive terminal 21 is not assembled in the terminal holding member 23, the width of the second socket 201 is less than the width of the third socket 203. Since the width of the second socket 201 is less than the width of the third socket 203 when the electrically conductive terminal 21 is not assembled in the terminal holding member 23, the electrically conductive terminal 21 does not particularly push out the terminal holding member 23 and the terminal holding member 23 does not particularly apply the positive force to the two sides of the electrically conductive terminal 21 to clamp the electrically conductive terminal 21 when the electrically conductive terminal 21 is assembled in the terminal holding member 23. In other words, compared with the conventional technology, the design of the electrically conductive terminal 21 and the terminal holding member 23 of the present disclosure allows users to perform assembly more easily.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An electrical connector assembly, comprising:

a housing, wherein one of upper and lower sides of the housing has two first sockets and another one of the upper and lower sides of the housing has an opening; and two electrically conductive connection members and two electrically conductive cable sets, wherein the two electrically conductive connection members are arranged in the housing and are respectively connected to the two electrically conductive cable sets, each of the two electrically conductive cable sets has at least one electrically conductive cable and extends on two sides of the electrically conductive connection member in a horizontal direction, and each of the two electrically conductive connection members includes:

an electrically conductive terminal arranged in the housing, wherein the electrically conductive terminal is integrally formed, the electrically conductive terminal has two leaf springs that are opposite to each other and a U-shaped connection part connected between the two leaf springs, each of the two leaf springs has a base and a plurality of elastic contact arms, the plurality of elastic contact arms are connected to one side of the base, and a second socket is formed between the two leaf springs;

a cable connection member correspondingly connected to the electrically conductive terminal and the corresponding electrically conductive cable set, wherein the cable connection member is bent and has a first connection part and a second connection part, the at least one electrically conductive cable is connected to the first connection part by soldering, and the second connection part is coupled to the U-shaped connection part; and a terminal holding member arranged in the housing and at a periphery of the electrically conductive terminal, wherein the terminal holding member has two sheet bodies that are arranged opposite to each other and a plate-shaped connection part connected between two same sides of the two sheet bodies, a guide opening that is opposite to the plate-shaped connection part is formed on a side of the terminal holding member, the two sheet bodies are bent in a direction towards each other and a third socket is formed therebetween, and the third socket aligns with the second socket;

wherein, when the electrically conductive terminal is assembled in the terminal holding member, the electrically conductive terminal is inserted into the terminal holding member through the guide opening;

wherein, when the two electrically conductive connection members are assembled in the housing, the second sockets of the two electrically conductive terminals correspond to the two first sockets, and the second socket of each of the two electrically conductive terminals is connected to a corresponding one of the first socket.

2. The electrical connector assembly according to claim 1, wherein the at least one electrically conductive cable has a cable main body and an electrically insulating material covering a periphery of the cable main body, and has the electrically insulating material removed so as to expose the cable main body, the cable main body that is exposed and the first connection part of the cable connection member are connected by using molten tin to cover the cable main body that is exposed and at least a portion of the first connection part.

3. The electrical connector assembly according to claim 2, wherein each of the two electrically conductive connection members further includes an insulating tape so as to cover the molten tin.

4. The electrical connector assembly according to claim 1, further comprising:

a groove body;

wherein the electrically conductive cable set has two electrically conductive cables that are arranged opposite to each other, and each of the two electrically conductive cables has a cable main body and an electrically insulating material covering a periphery of the cable main body; and wherein, one terminal of each of the two electrically conductive cables has the electrically insulating material removed so as to expose the cable main body, the cable main bodies that are exposed from the two electrically conductive cables are arranged in the groove body, and the groove body is filled with molten tin so as to cover the two cable main bodies that are exposed and at least a portion of the first connection part.

5. The electrical connector assembly according to claim 4, wherein the electrically conductive connection member further includes an insulating tape so as to cover the molten tin.

6. The electrical connector assembly according to claim 1, further comprising:

a groove body:

wherein the groove body has a first plate wall and a second plate wall that are opposite to each other, and a third plate wall connected between the first plate wall and the second plate wall; and wherein the first connection part of the cable connection member is coupled to the groove body and is arranged in the groove body.

7. The electrical connector assembly according to claim 6, wherein at least one first engage hole is arranged between the first plate wall and the third plate wall, and at least one second engage hole is arranged between the third plate wall and the second plate wall; wherein at least one first protrusion part corresponding to the at least one first engage hole and at least one second protrusion part corresponding to the at least one second engage hole are respectively arranged on two sides of the first connection part; and wherein the first connection part of the cable connection member is fixedly connected to the groove body through snap-fixing of the at least one first protrusion part and the at least one second protrusion part to the at least one first engage hole and the at least one second engage hole, respectively.

8. The electrical connector assembly according to claim 6, wherein the at least one electrically conductive cable has a cable main body and an electrically insulating material covering a periphery of the cable main body, a middle portion of the at least one electrically conductive cable has the electrically insulating material removed so as to expose the cable main body, the exposed cable main body is arranged in the groove, and the groove body is filled with molten tin so as to cover the cable main body that is exposed and at least a portion of the first connection part.

9. The electrical connector assembly according to claim 8, wherein the electrically conductive connection member further includes an insulating tape so as to cover the molten tin and the groove body.

10. The electrical connector assembly according to claim 6, wherein the electrically conductive cable set has two electrically conductive cables that are arranged opposite to each other, each of the two electrically conductive cables has a cable main body and an electrically insulating material covering a periphery of the cable main body, one terminal of each of the two electrically conductive cables has the electrically insulating material removed so as to expose the cable main body, the cable main bodies of the two electrically conductive cables are arranged in the groove body, and the groove body is filled with molten tin so as to cover the two cable main bodies that are exposed and at least a portion of the first connection part.

11. The electrical connector assembly according to claim 10, wherein the electrically conductive connection member further has an insulating tape so as to cover the molten tin and the groove body.

12. The electrical connector assembly according to claim 1, wherein, when the electrically conductive terminal is not assembled in the terminal holding member, a width of the second socket is less than a width of the third socket.

13. The electrical connector assembly according to claim 1, wherein the housing further has a first side wall and a second side wall that are opposite to each other, and the housing has a third side wall and a fourth side wall that are arranged between the first side wall and the second side wall and are opposite to each other; wherein an inner side of the first side wall has two guide members, and each of the two guide members has a sliding groove and a bump arranged at one end of the sliding groove; and wherein the second side wall has two cantilever members, each of the two cantilever members has a first terminal and a second terminal that are opposite to each other, the first terminal is connected to the second side wall, the second terminal is overhung, and a thickness of the second terminal is greater than a thickness of the first terminal.

14. The electrical connector assembly according to claim 13, wherein the plate-shaped connection part abuts the second terminal of one of the two cantilever members.

15. The electrical connector assembly according to claim 13, wherein the U-shaped connection part is arranged in one of the two sliding grooves and abuts a corresponding one of the bumps.

16. The electrical connector assembly according to claim 13, wherein the housing further has a partition, the partition is arranged in the housing and is connected between the first side wall and the second side wall so as to divide an inside of the housing into a first accommodating space and a second accommodating space, and the two electrically conductive connection members are respectively arranged in the first accommodating space and the second accommodating space; wherein a first stop block and a second stop block are respectively arranged on two sides of the partition, a third stop block is arranged on an inner side of the third side wall, and a fourth stop block is arranged on an inner side of the fourth side wall; and wherein the first stop block and the third stop block are arranged in the first accommodating space, and the second stop block and the fourth stop block are arranged in the second accommodating space.

17. The electrical connector assembly according to claim 16, wherein the terminal holding member further has two bent segments, each of the two bent segments is adjacent to the guide opening and is arranged in the corresponding sheet body; wherein, when one of the two electrically conductive connection members is assembled in the first accommodating space, the two bent segments of the terminal holding member of the one of the two electrically conductive connection members respectively abut the first stop block and the third stop block; and wherein, when another one of the two electrically conductive connection members is assembled in the second accommodating space, the two bent segments of the terminal holding member of the another one of the two electrically conductive connection members respectively abut the second stop block and the fourth stop block.

18. The electrical connector assembly according to claim 1, further comprising:

a cover detachably disposed on the side of the housing that has the opening.

19. The electrical connector assembly according to claim 1, wherein the terminal holding member further has two through holes, the electrically conductive terminal further has two cantilever hooks corresponding to the two through holes, and each of the two cantilever hooks is arranged between the base and the plurality of elastic contact arms; and wherein, when the electrically conductive terminal is assembled in the terminal holding member, the electrically conductive terminal is inserted into the terminal holding member through the guide opening, and each of the two cantilever hooks is engaged to the corresponding through hole.

20. The electrical connector assembly according to claim 19, wherein a terminal of each of the two cantilever hooks has an inclined surface, and the inclined surface extends and inclines inwardly in an insertion direction along which the electrically conductive terminal is inserted into the terminal holding member.

* * * * *